(12) United States Patent
Chae et al.

(10) Patent No.: US 10,117,200 B2
(45) Date of Patent: Oct. 30, 2018

(54) METHOD AND APPARATUS FOR ACQUIRING SYNCHRONIZATION FOR DEVICE TO DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Inkwon Seo, Seoul (KR); Hanbyul Seo, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/303,464

(22) PCT Filed: Apr. 22, 2015

(86) PCT No.: PCT/KR2015/004012
§ 371 (c)(1),
(2) Date: Oct. 11, 2016

(87) PCT Pub. No.: WO2015/163686
PCT Pub. Date: Oct. 29, 2015

(65) Prior Publication Data
US 2017/0041891 A1   Feb. 9, 2017

Related U.S. Application Data

(60) Provisional application No. 61/989,500, filed on May 6, 2014, provisional application No. 61/982,857, filed on Apr. 22, 2014.

(51) Int. Cl.
*G01R 31/08*   (2006.01)
*H04B 3/30*   (2006.01)
(Continued)

(52) U.S. Cl.
CPC ......... *H04W 56/001* (2013.01); *H04W 52/04* (2013.01); *H04W 56/00* (2013.01);
(Continued)

(58) Field of Classification Search
CPC  H04W 56/002; H04W 56/0065; H04W 58/18
See application file for complete search history.

(56) References Cited

U.S. PATENT DOCUMENTS

2004/0252632 A1* 12/2004 Bourdoux ............ H04B 7/0452
370/210
2010/0189188 A1* 7/2010 Li ........................ H03G 3/3078
375/260
(Continued)

FOREIGN PATENT DOCUMENTS

| KR | 1020130029355 | 3/2013 |
| WO | 2013002688 | 1/2013 |
| WO | 2013066126 | 5/2013 |

OTHER PUBLICATIONS

European Patent Office Application Serial No. 15783738.6, Search Report dated Nov. 24, 2017, 10 pages.
(Continued)

*Primary Examiner* — Abu-Sayeed Haque
(74) *Attorney, Agent, or Firm* — Lee Hong Degerman Kang Waimey

(57) ABSTRACT

Disclosed is a method for acquiring a synchronization by a device to device (D2D) terminal in a wireless communication system, according to an embodiment of the present invention, the method comprising the steps of: measuring D2D synchronization signal reception power and/or D2D synchronization signal reception quality from a D2D synchronization signal; selecting a D2D synchronization signal to be used for synchronization acquisition on the basis of the measurement result; and acquiring a synchronization from the selected D2D synchronization signal, wherein the D2D
(Continued)

synchronization signal reception quality is a value obtained by dividing the D2D synchronization signal reception power by the differential between total reception power and the D2D synchronization signal reception power.

10 Claims, 7 Drawing Sheets

(51) Int. Cl.
*H04L 12/08* (2006.01)
*H04W 56/00* (2009.01)
*H04W 52/04* (2009.01)
*H04W 76/14* (2018.01)
*H04W 84/18* (2009.01)

(52) U.S. Cl.
CPC ......... *H04W 56/002* (2013.01); *H04W 76/14* (2018.02); *H04W 84/18* (2013.01)

(56) References Cited

U.S. PATENT DOCUMENTS

| | | | | |
|---|---|---|---|---|
| 2012/0106372 A1* | 5/2012 | Gaal | ................... | H04B 1/7097 370/252 |
| 2013/0185373 A1 | 7/2013 | Vandwalle et al. | | |
| 2013/0322276 A1* | 12/2013 | Pelletier | .............. | H04W 72/085 370/252 |
| 2015/0009949 A1* | 1/2015 | Khoryaev | ............. | H04W 48/16 370/330 |
| 2016/0113050 A1* | 4/2016 | Li | ..................... | H04W 52/0209 370/329 |
| 2016/0142898 A1* | 5/2016 | Poitau | ................... | H04W 76/14 370/329 |

OTHER PUBLICATIONS

PCT International Application No. PCT/KR2015/004012, Written Opinion of the International Searching Authority dated Aug. 13, 2015, 15 pages.

LG Electronics, "Discussion on D2D Synchronization Procedure", R1-140330, 3GPP TSG RAN WG1 Meeting #76, Feb. 1, 2014, 7 pages.

Intel Corporation, "Preliminary performance analysis of D2D synchronization", R1-135114, 3GPP TSG RAN WG1 Meeting #75, Nov. 2, 2013, 8 pages.

LG Electronics et al., "WF on D2DSS selection", R1-140895, 3GPP TSG RAN WG1 #76, Feb. 17, 2014, 3 pages.

* cited by examiner

METHOD AND APPARATUS FOR ACQUIRING SYNCHRONIZATION FOR DEVICE TO DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/004012, filed on Apr. 22, 2015, which claims the benefit of U.S. Provisional Application No. 61/982,857, filed on Apr. 22, 2014 and 61/989,500, filed on May 6, 2014, the contents of which are all hereby incorporated by reference herein in their entirety.

TECHNICAL FIELD

The present invention relates to a wireless communication system, and more particularly, to a method of performing measurement, a method of acquiring synchronization, and an apparatus therefor in a device to device communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide a method of measuring a user equipment in D2D communication and a method of selecting a synchronization signal based on the method of measuring the user equipment.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of obtaining synchronization, which is obtained by a D2D (device to device) UE in a wireless communication system, includes the steps of measuring at least one of D2D synchronization signal reception power and D2D synchronization signal reception quality from a D2D synchronization signal, selecting a D2D synchronization signal to be used for obtaining synchronization based on a result of the measurement, and obtaining synchronization from the selected D2D synchronization signal. In this case, the D2D synchronization signal reception quality may correspond to a value resulted from dividing the D2D synchronization signal reception power by a difference between total reception power and the D2D synchronization signal reception power.

To further achieve these and other advantages and in accordance with the purpose of the present invention, according to a different embodiment, a D2D (device to device) UE in a wireless communication system includes a reception module and a processor, the processor configured to measure at least one of D2D synchronization signal reception power and D2D synchronization signal reception quality from a D2D synchronization signal, the processor configured to select a D2D synchronization signal to be used for obtaining synchronization based on a result of the measurement, the processor configured to obtain synchronization from the selected D2D synchronization signal. In this case, the D2D synchronization signal reception quality may correspond to a value resulted from dividing the D2D synchronization signal reception power by a difference between total reception power and the D2D synchronization signal reception power.

Preferably, the D2D synchronization signal reception power may correspond to average of D2D synchronization signal sequence reception power of a predetermined ID.

Preferably, the average of the D2D synchronization signal sequence reception power may correspond to linear average of power contribution of a resource element carrying a D2D synchronization signal sequence of the predetermined ID.

Preferably, the D2D synchronization signal reception power can be measured after a frequency offset is compensated.

Preferably, the total reception power may relate to a symbol period determined by the UE.

Preferably, the symbol period may correspond to a symbol length which is predetermined on the basis of timing at which a peak occurs while the D2D synchronization signal and predetermined sequences are correlated with each other.

Preferably, the symbol period may correspond to a symbol length which is predetermined on the basis of timing firstly exceeding a predetermined value while the D2D synchronization signal and predetermined sequences are correlated with each other.

Preferably, the D2D synchronization signal reception power may correspond to a correlation result value of timing at which a peak occurs while the D2D synchronization signal and predetermined sequences are correlated with each other.

Preferably, the D2D synchronization signal reception power may correspond to average of correlation result values of timing at which N number of peaks occur while the D2D synchronization signal and predetermined sequences are correlated with each other.

Preferably, the D2D synchronization signal reception power may correspond to average of peak values exceeding a predetermined value among results of correlation between the D2D synchronization signal and predetermined sequences.

Preferably, the D2D synchronization signal can be transmitted on 6 resource blocks located at the center of a subframe.

Advantageous Effects

According to embodiments of the present invention, a D2D UE can efficiently perform measurement and/or select a synchronization signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
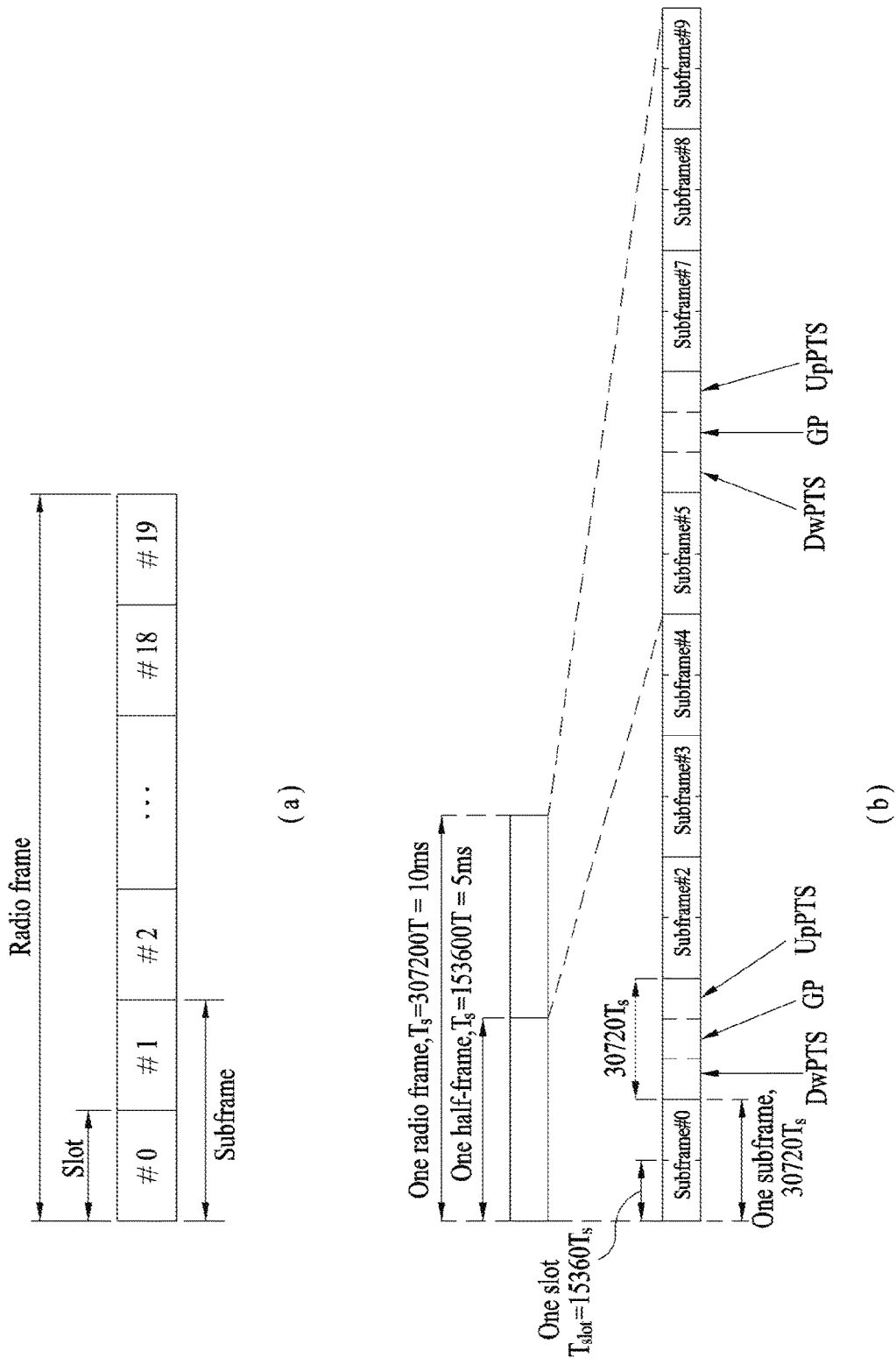
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN- OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
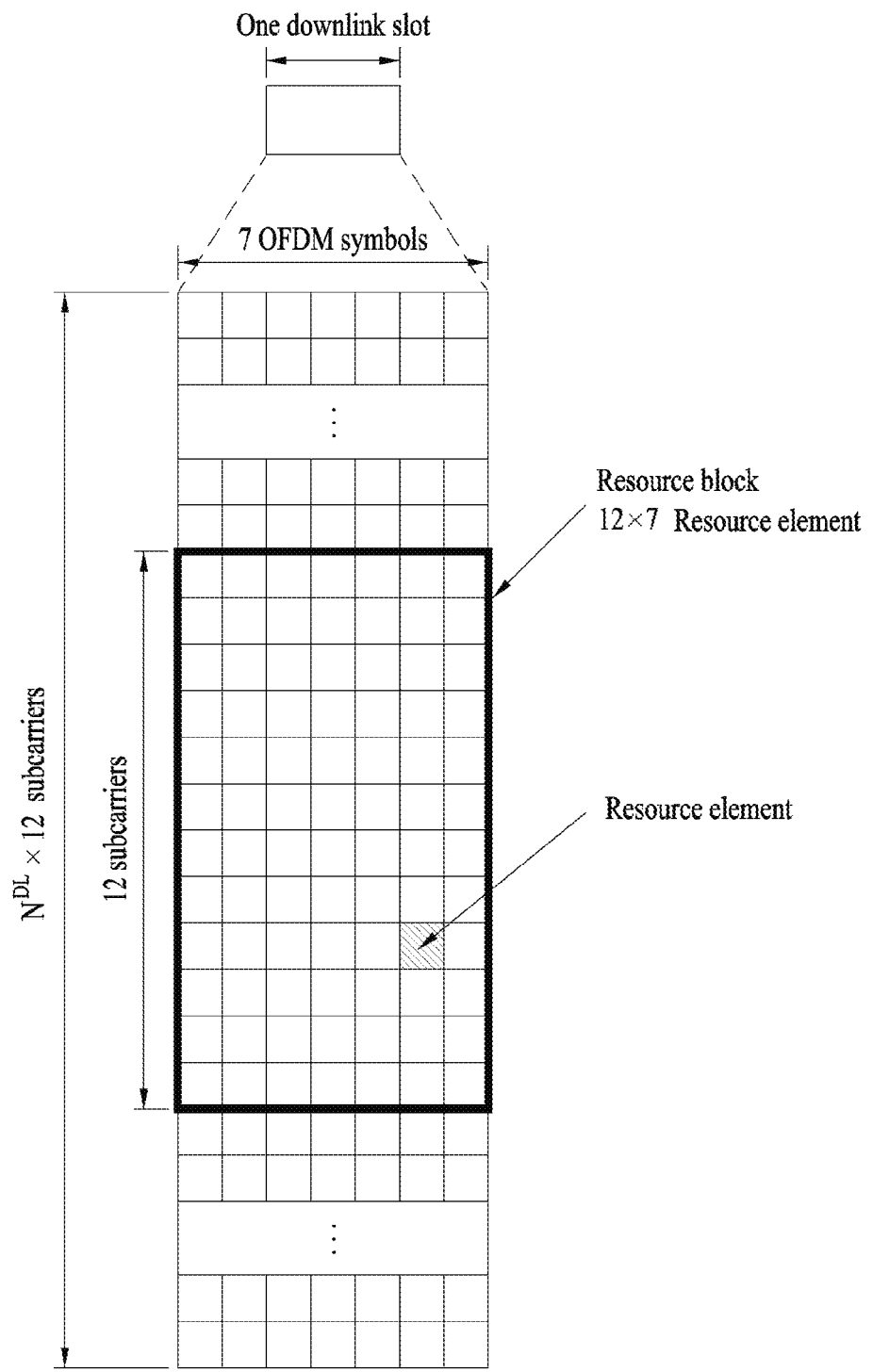
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
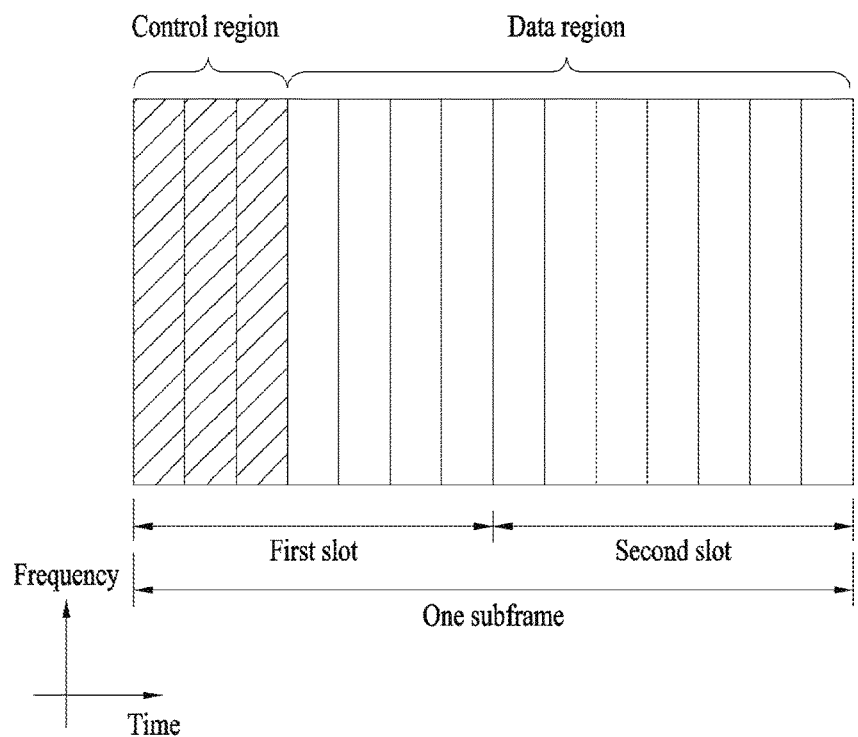
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
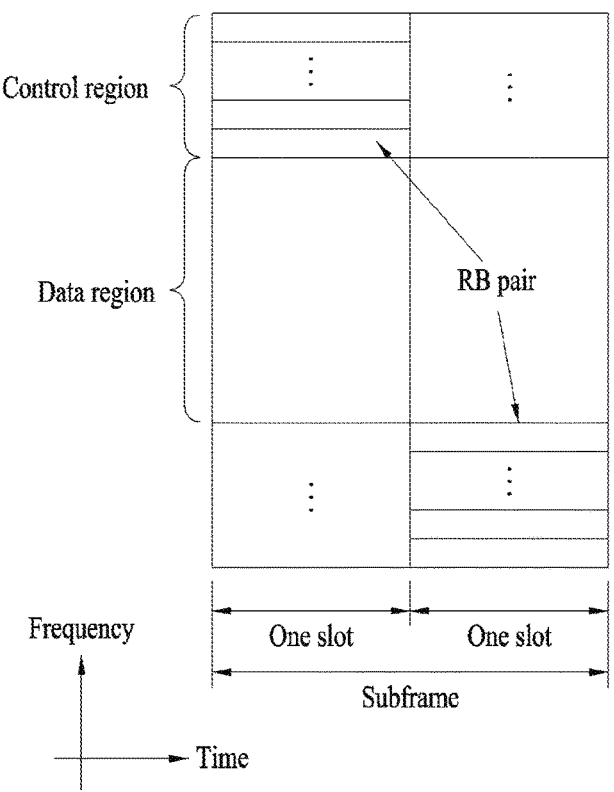
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Measurement/Measurement Report

Measurement report is performed for one or more methods (handover, random access, cell search, etc.) for securing mobility of a UE. Since the measurement report requires coherent demodulation in some degree, the measurement report can be performed after a synchronization parameter and a physical layer parameter are obtained by a UE except reception signal strength measurement. The measurement report can include RRM measurement including RSRP (reference signal receive power), RSSI (received signal strength indicator), RSRQ (reference signal received quality), etc. for measuring signal strength of a serving cell and a neighboring cell or signal strength compared to total reception power and RLM measurement capable of evaluating whether or not a radio link is failed by measuring link quality with a serving cell.

In relation to the RRM, the RSRP is a liner average of power distribution of an RE in which a CRS is transmitted in downlink. The RSSI is a linear average of total reception power received by a UE and the RSSI is measured for an OFDM symbol including an RS for an antenna port 0. The RSSI corresponds to a measurement value including interference, noise power, and the like. If higher layer signaling indicates a specific subframe to measure the RSRQ, the RSSI is measured for all OFDM symbols included in the indicated specific subframe. The RSRQ is a value measured in a form of N*RSRP/RSSI. In this case, the N corresponds to the number of RBs of a corresponding bandwidth at the time of measuring the RSSI.

The RLM is performed to determine whether a UE is 'in-synch' or 'out-of-synch' for a corresponding cell by making the UE monitor downlink quality of a serving cell of the UE. In this case, the RLM is performed based on a CRS. The downlink quality estimated by the UE is compared with 'in-synch threshold (Qin) and 'out-of-synch threshold (Qout)'. The thresholds can be represented by a PDCCH BLER (block error rate) of a serving cell. In particular, the Qout and the Qin correspond to 10% BLER and 2% BLER, respectively. Practically, the Qin and the Qout are values corresponding to SINR of a received CRS. If reception SINR of the CRS is equal to or greater than a predetermined level (Qin), a UE determines to attach to a corresponding cell. If the reception SINR is equal to or less than the predetermined level (Qout), the UE declares RLF (radio link failure.

Synchronization Acquisition of D2D UE

In the following, synchronization acquisition between UEs in D2D communication is explained based on the aforementioned description and a legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

A transmission period of a D2DSS is not less than 40 ms and one or more symbols can be used for transmitting a D2DSS in a subframe.

D2DSSs may include a primary D2DSS (PD2DSS) or a primary sidelink synchronization signal (PSSS) and a secondary D2DSS (SD2DSS) or a secondary sidelink synchronization Signal (SSSS). The PD2DSS may be configured to have a similar/modified/repeated structure of a Zadoff-chu sequence of a predetermined length or a primary synchronization signal (PSS), and the SD2DSS may be configured to have a similar/modified/repeated structure of an M-sequence or a secondary synchronization signal (SSS).

When a D2D UE selects a D2D synchronization source, it is necessary to apply an identical priority reference. In out-coverage situation, if signal strength of all received D2DSSs is equal to or less than a predetermined value, a UE may become a synchronization source. And, in in-coverage situation, an eNB can configure a UE as a synchronization source. If UEs match synchronization with each other from an eNB, a synchronization source may correspond to the eNB and a D2DSS may correspond to a PSS/SSS. A D2DSS of a synchronization source induced from an eNB may be different from a D2DSS of a synchronization source not induced from the eNB.

A PD2DSCH (physical D2D synchronization channel) may correspond to a (broadcast) channel on which (system) information (e.g., D2DSS-related information, duplex mode (DM), TDD UL/DL configuration, resource pool-related information, a type of application related to a D2DSS, etc.), which is basic information to be firstly known to a UE before a D2D signal is transmitted and received, is transmitted. The PD2DSCH can be transmitted in a subframe in which a D2DSS is transmitted or a following subframe.

The D2DSS may correspond to a specific sequence and the PD2DSCH may correspond to a sequence representing specific information or a codeword produced by predetermined channel coding. In this case, the SRN may be an eNB or a specific D2D UE. In the case of partial network coverage or out of network coverage, a UE may become a synchronization source.

Figure 5:
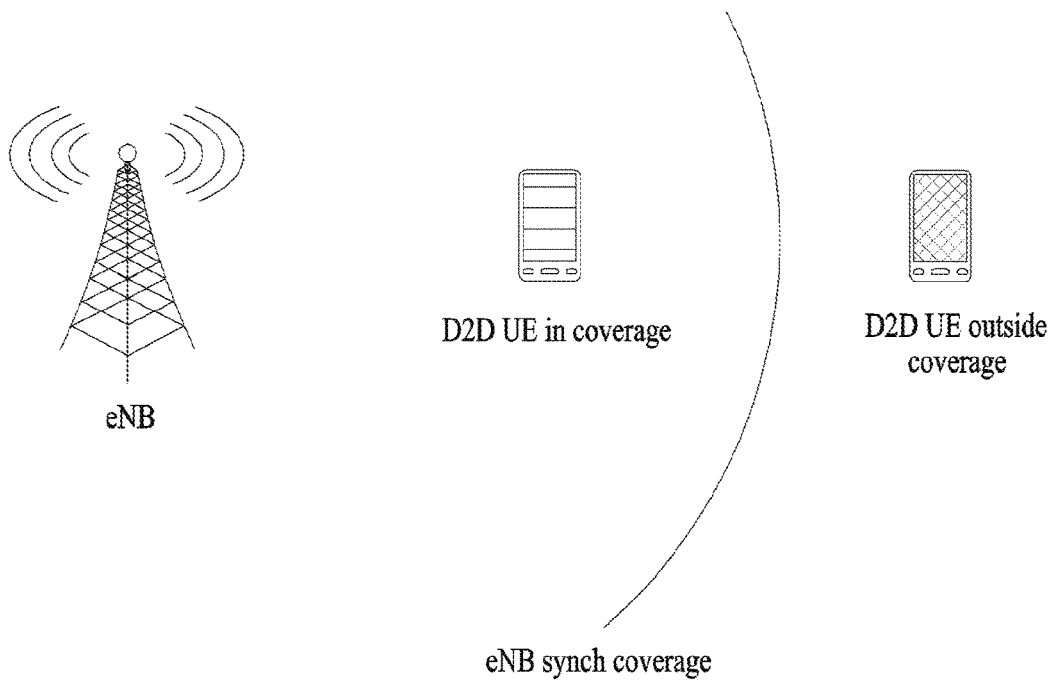
FIG. 5 is a diagram for explaining relay of a synchronization signal.
Figure 6:
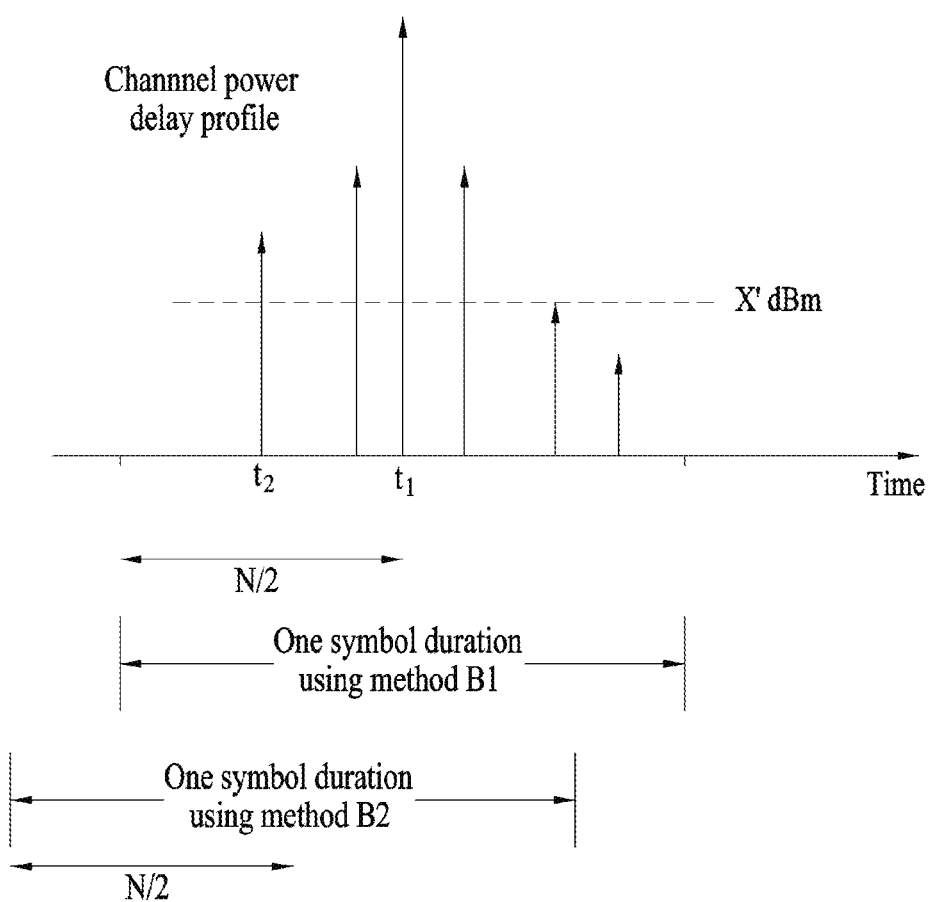
FIGS. 6 to 8 are diagrams for explaining a measurement method to embodiments of the present invention.

In a situation illustrated in FIG. 5, a D2DSS may be relayed for D2D communication with an out-of-coverage UE. The D2DSS may be relayed over multiple hops. The following description is given with the appreciation that relay of a synchronization signal covers transmission of a D2DSS in a separate format according to a synchronization signal reception time as well as direct AF-relay of a synchronization signal transmitted by an eNB. As the D2DSS is relayed, an in-coverage UE may directly communicate with an out-of-coverage UE. FIG. 6 illustrates an exemplary case that a D2DSS is relayed and communication is conducted between D2D UEs based on the relayed D2DSS.

As mentioned in the foregoing description, a D2D UE can obtain synchronization with a UE configured to perform D2D transmission and reception from a synchronization signal. In this case, a D2D synchronization signal can be selected in consideration of reception strength and/or reception quality of the D2D synchronization signal. More specifically, a D2D UE can receive a plurality of D2D synchronization signals. In this case, if synchronization is matched with an optimal D2D synchronization signal among a plurality of the D2D synchronization signals, it may be helpful for performing D2D transmission and reception. And, in terms of a synchronization cluster, if all of D2D UEs adjacent to each other respectively match synchronization with a D2D synchronization signal on the basis of a reference of its own, it may be difficult to form a D2D synchronization cluster. As a solution for the aforementioned problem, it may be able to consider reception strength and/or reception quality of a D2D synchronization signal at the time of selecting the D2D synchronization. In the following description, the solution is explained in detail. In the following, D2D synchronization signal reception power is referred to as DSSRP (D2DSS received power) and the DSSRP corresponds to a signal strength-based metric. D2D synchronization signal reception quality is referred to as DSSRQ (D2DSS received quality) and the DSSRQ may correspond to an SINR-based metric. Following description can be applied not only to a D2DSS but also to a DMRS which is transmitted together with a PSBCH (physical sidelink broadcast channel). In particular, while measurement is performed using a scheme described in the following, a measurement target signal may correspond to a DMRS, which is transmitted together with a PSBCH, instead of a D2DSS.

DSSRQ

A D2D UE measures at least one of DSSRP and DSSRQ from a D2D synchronization signal and may be then able to select a D2D synchronization signal to be used for obtaining synchronization based on a result of the measurement. Subsequently, the D2D UE can obtain synchronization from the selected D2D synchronization signal.

In this case, the DSSRQ can be defined by a value resulted from dividing D2D synchronization signal reception power by a difference between total reception power and the D2D synchronization signal reception power. In particular, it can be represented as equation 1 in the following.

$$T = \frac{X}{Y} = \frac{X}{Z - X} \qquad \text{[Equation 1]}$$

In equation 1, T corresponds to an SINR-based D2DSS measurement metric in time domain. In particular, the T may correspond to DSSRQ. And, Z corresponds to total reception power and X may correspond to a strength-based metric. In particular, the X may correspond to DSSRP. Y may correspond to the total amount of interference. The DSSRQ can be calculated in frequency domain.

Referring to equation 1, unlike RSRQ defined in a legacy LTE system, it is able to see that a size of the strength-based metric is excluded from the total reception power in a denominator. According to the RSRQ of the legacy LTE system, RSRP is firstly calculated and the RSRP is divided by RSSI. Power of an antenna port 0 is first calculated in the RSRP and reception power of a symbol transmitted by the port 0 is calculated in the RSSI. In this case, although a component of the port 0 is capable of being divided again in a denominator, since the number of REs occupied by the port 0 is ⅙ of the number of REs of the total symbols, it does not affect SINR (signal to noise plus interference ratio) calculation using the RSRQ. On the contrary, in case of a D2DSS, if a desired signal is transmitted to most part of an RE of a corresponding symbol and the desired signal is divided again by a denominator, since the desired signal is divided again, it is difficult to precisely calculate SINR. Hence, when RSRQ is calculated in a UL signal together with a D2D signal, SINR approximation is performed by excluding a desired signal part from a denominator instead of directly dividing reception power by the denominator.

If a D2DSS is configured by a plurality of symbols, the denominator (symbol reception power or interference signal power) of equation 1 may correspond to an average of a plurality of the symbols. Or, average DSSRQ can be calculated by obtaining DSSRQ according to a symbol and averaging the DSSRQ among a plurality of the symbols. And, if a transmission period of a D2DSS corresponds to N ms, the predefined transmission count or an average value during time duration can be defined as a metric. In this case, transmission count or time necessary for calculating a measurement metric can be signaled by a network in advance or can be configured in advance. When an average is calculated, the average can be calculated by obtaining DSSRQ according to a symbol. Or, DSSRQ can be calculated in a manner of averaging DSSRP between symbols, averaging symbol reception power between symbols, and dividing an average value.

When the DSSRQ is calculated, the total reception power may correspond to a symbol period determined by the UE. In particular, the DSSRQ can be defined in time domain. The symbol period may correspond to a symbol length which is predetermined on the basis of time of peak occurrence among correlation between a D2D synchronization signal and predetermined sequences (method B1). Or, the symbol period may correspond to a symbol length which is predetermined on the basis of time of firstly exceeding a predetermined value among correlation between a D2D synchronization signal and predetermined sequences (method B2).

FIG. 6 shows an example of the symbol period. Referring to FIG. 6, a UE considers t1 corresponding to a point at which a biggest peak occurs as a center point of a symbol length while performing correlation on a D2DSS. If a symbol length corresponds to N, the UE can determine [x−N/2, x+N/2] as a symbol length. Or, the UE considers time of firstly exceeding X' dBm as a reference point x. if a symbol length corresponds to N, the UE can determine [x−N/2, x+N/2] as a symbol length.

The aforementioned DSSRQ corresponds to a metric calculated in consideration of such interference as SINR, RSRQ, and the like. If the metric is used, in a situation that a plurality of UEs transmit a D2DSS at the same (or different) time in out of coverage, it is able to solve a problem of having a bad influence on D2DSS detection performance due to a D2DSS transmitted by a different UE affecting as interference on the D2DSS transmitted by a plurality of the UEs.

DSSRQ can also be calculated by equation 2 in the following.

$$T = \frac{X}{Z} \qquad \text{[Equation 2]}$$

T, X, and Z may be identical to what is defined earlier in the explanation on the equation 1. When the Z is calculated, it may be able to average reception power of frequency domain on which a D2DSS is transmitted only. Equation 2 corresponds to a method of normalizing by the total amount of all reception signal power.

When DSSRQ is calculated using equation 2 in frequency domain, if a same OFDM symbol period is assumed between sequences of a different ID, there is no difference between a size order of DSSRP and a size order of DSSRQ. This is because, if normalizing is performed by the sum of all reception signals, normalizing is performed on reception power of a different sequence by a same value. Hence, when the DSSRQ is defined in the frequency domain, as mentioned earlier in equation 1, it is necessary to exclude specific sequence reception power from the total reception power or it is necessary to individually define an OFDM symbol period according to a sequence. Hence, it is able to calculate the total reception power based on the aforementioned calculation.

The aforementioned method corresponds to calculation performed on a specific D2DSS. If a sequence ID of a D2DSS is different, individual calculation is necessary. In this case, a different definition on an OFDM symbol period can be used according to a sequence or a same definition on an OFDM symbol period can be used irrespective of a sequence ID. If it is assumed that a different signal is not transmitted to a region to which a D2DSS is transmitted, interference of the D2DSS can be calculated as follows. If the number of sequence IDs used by the D2DSS corresponds to N, a specific ID among the N number of IDs is considered as a signal and the remaining N−1 number of IDs are considered as interference. In this case, interference signal power strength can be calculated by measuring power received by sequences of the sequence IDs considered as interference and putting the power together.

DSSRP

In the foregoing description, the DSSRP may correspond to average of D2D synchronization signal sequence reception power. In this case, the average of the D2D synchronization signal sequence reception power may correspond to a linear average of power contribution of a resource element that carries a D2D synchronization signal sequence of a predetermined ID. In particular, the DSSRP can be defined as a linear average of power contributions of REs that carry a D2D synchronization sequence(s) including a sequence ID in a D2D transmission frequency band.

In particular, frequency domain conversion is performed on all D2DSSs received by a value equal to or greater than a threshold and average of power received by a specific D2DSS sequence is configured as a D2DSS measurement metric. In this case, it indicates power received by a specific sequence instead of power received by an RE to which a D2DSS is transmitted. In this case, measurement in the frequency domain may correspond to measurement which is performed after a frequency offset is compensated. If a D2DSS is transmitted to symbols of a plurality of PD2DSSs and/or SD2DSSs, average of the symbols can be defined as a metric. If a transmission period of a D2DSS corresponds to N ms, a value averaged during predetermined transmission count or time duration can be defined as a metric. In this case, the transmission count or the time necessary for calculating the measurement metric can be signaled by a network in advance or can be configured in advance.

As described in the following description, the DSSRP can also be defined in time domain.

A1. A correlator output (matched filter output) value of a point at which a peak appears, a square value of the correlator output value, or a value resulted from normalizing the square value by sequence transmit power or a predetermined constant number. (For example, the DSSRP may correspond to a correlation result value of a point at which a peak occurs while a D2D synchronization signal and predetermined sequences are correlated with each other.)

A2. Sum (or average) of a square value of a correlator output value of a point at which a peak appears, a second peak, . . . , $N^{th}$ peak or a value resulted from normalizing the sum (or average) by sequence transmit power or a predetermined constant number. In this case, the N may correspond to a predetermined value. (For example, the DSSRP may correspond to average of correlation result values of points at which N number of peaks occur while a D2D synchronization signal and predetermined sequences are correlated with each other.)

A3. Sum (or average) of square values of all peak values exceeding X dBm among correlator outputs or a value resulted from normalizing the sum (or average) by sequence transmit power or a predetermined constant number. In this case, the X may correspond to a predetermined value. (For example, the DSSRP may correspond to average of peak values exceeding a predetermined value among correlation results between a D2D synchronization signal and predetermined sequences.)

Figure 7:
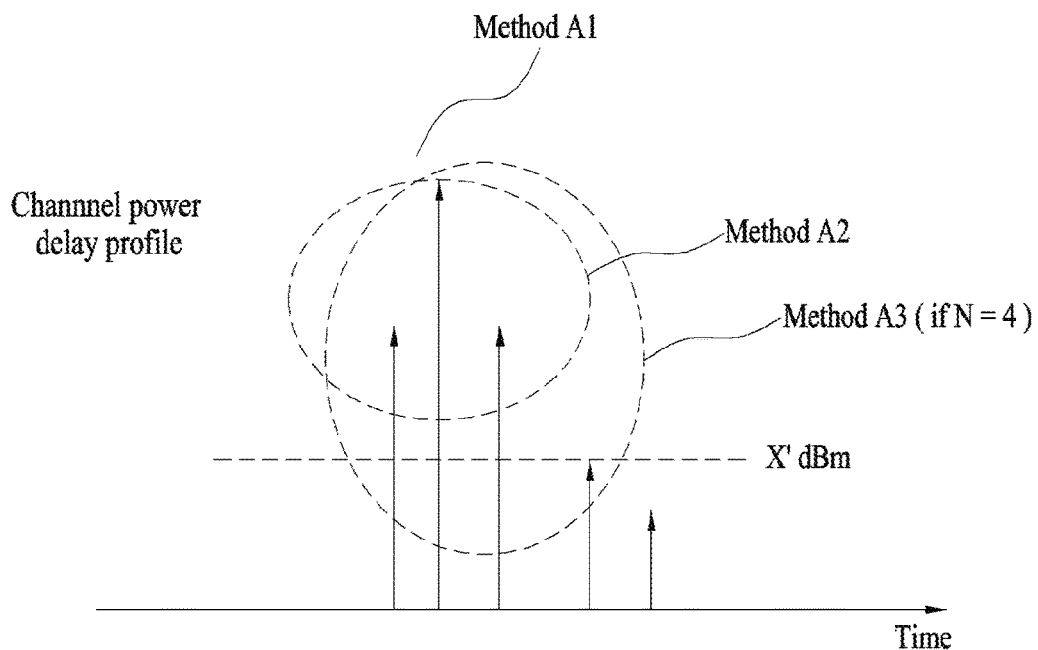

In FIG. 7, cases of the A1, the A2, and the A3 are depicted. In the foregoing description, if a square value of a correlator output is divided by sequence transmit power, consequently, it may indicate reception power of a specific sequence.

According to the aforementioned scheme, it may be able to obtain a metric value before conversion is performed in frequency domain using a method of defining reception power as a metric in time domain. Hence, after the frequency domain is converted, since it is not necessary to perform frequency domain conversion and frequency offset estimation operation on a D2DSS not to be used prior to frequency offset compensation, it may be able to reduce implementation complexity.

Meanwhile, a plurality of UEs can transmit an identical D2DSS at the same time in an SFN (single frequency network) manner. Although the D2DSS is transmitted at the same time, it can be seen as a plurality of signals are received in a manner of being spread in time domain in terms of a UE. In this case, it may be able to differently define a measurement metric depending on reference timing of receiving signals using an SFN. As a first proposal for the reference timing, reception power of a D2DSS sequence where correlation becomes a peak can be defined as a D2DSS measurement metric. According to the present scheme, a UE can calculate DSSRP/DSSRQ by considering a peak point of correlation as a center point of an OFDM symbol among D2DSSs received using the SFN. As a second proposal of the reference timing, It may be able to define timing to which T time offset is applied as a measurement metric at a point where correlation becomes a peak. According to the present scheme, a predetermined offset is applied to a peak point among D2DSSs received using the SFN. In order to compensate a timing error via delay propagation, a predetermined offset point is determined as timing reference.

It may be able to define DSSRP/DSSRQ in time domain or frequency domain on the basis of the symbol area proposed in the foregoing description. In particular, it is able to define both the DSSRP and the DSSRQ by the aforementioned metric definition schemes in response to the two proposed reference timings.

Figure 8:
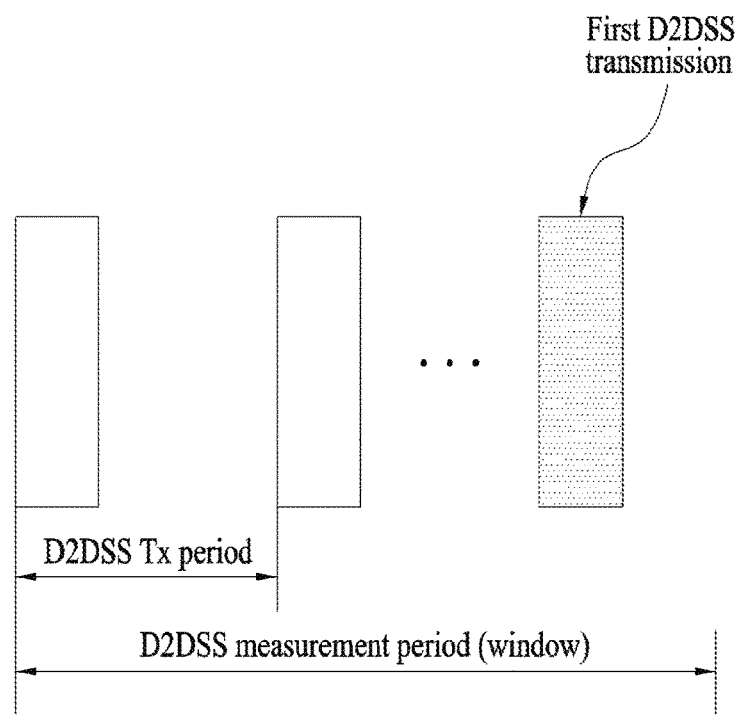

Meanwhile, in case of measuring the DSSRP or the DSSRQ of the proposed D2DSS, it may be able not only to perform averaging on reception of a signal D2DSS but also to perform measurement average according to a predetermined section or predetermined transmission count to handle change of a channel and increase reliability of measurement. The predetermined section or the predetermined transmission count can be referred to as a D2DSS measurement window (this can also be referred to as a different term such as measurement period or measurement duration). When a D2DSS is examined in the D2DSS measurement window, if simple averaging is performed on the examined D2DSS, it may lead to an incorrect measurement result in a method that a D2DSS is not transmitted in every D2DSS transmission period. For example, if averaging is performed on a D2DSS of the window to measure the D2DSS of a UE, which has transmitted the D2DSS for the first time in the last D2DSS transmission in the measurement window, since a measurement value is too low, it can be determined as the D2DSS is not transmitted or quality of the D2DSS is very poor. Regarding this, it is explained with reference to an example of FIG. 8. FIG. 8 shows an example for a case that a D2DSS is firstly transmitted in a D2DSS measurement window, in particular, in a last D2DSS transmission interval. If D2DSS measurement and averaging in the window are constantly performed while the measurement window is sliding, it is able to determine that a D2DSS is received after the window is considerably slid. In particular, if a transmission period of a D2DSS is relatively longer than a transmission period of a legacy PSS/SSS, the aforementioned measurement delay may have a bad influence on D2D signal transmission and reception. In order to prevent this problem from being occurred, a D2DSS can be reflected/used to/for D2DSS measurement average only when the D2DSS is actually transmitted (or, only when reception quality of an individual D2DSS is equal to or greater than a predetermined level). More specifically, measurement can be performed only when a measurement result value for single D2DSS reception exceeds X dB in the D2DSS measurement window. In this case, the threshold value X can be determined in advance or can be configured by a network.

Configurations of Apparatuses According to Embodiment of the Present Invention

Figure 9:
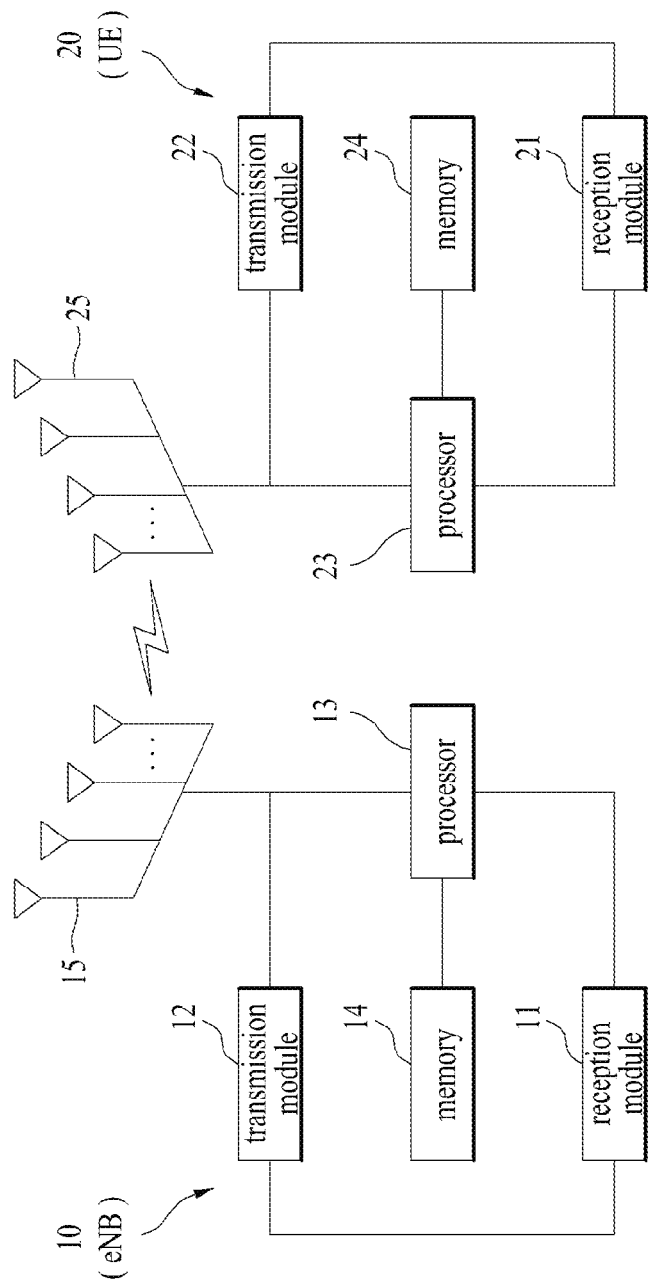
FIG. 9 is a diagram for a configuration of a transceiver.

FIG. 9 is a block diagram of a transmission point and a UE according to an embodiment of the present invention.

Referring to FIG. 9, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 9 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 9 is applicable to a relay as a DL transmitter or a UL receiver, and the description of the UE 20 in FIG. 9 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

What is claimed is:

1. A method of obtaining synchronization, which is obtained by a D2D (device to device) UE in a wireless communication system, comprising the steps of:
measuring at least one of D2D synchronization signal reception power for received D2D synchronization signals;
calculating D2D synchronization signal reception quality using the measured D2D synchronization signal reception power;
selecting a D2D synchronization signal among the received D2D synchronization signals based on the D2D synchronization signal reception quality; and
obtaining a synchronization from the selected D2D synchronization signal,
wherein the D2D synchronization signal reception quality corresponds to a value resulted from dividing the D2D synchronization signal reception power by a difference between total reception power and the D2D synchronization signal reception power, and
wherein the total reception power is related to a symbol period corresponding to a predetermined symbol length based on a timing at which a peak occurs while the D2D synchronization signal and predetermined sequences are correlated with each other.

2. The method of claim 1, wherein the D2D synchronization signal reception power corresponds to average of D2D synchronization signal sequence reception power of a predetermined ID.

3. The method of claim 2, wherein the average of the D2D synchronization signal sequence reception power corresponds to linear average of power contribution of a resource element carrying a D2D synchronization signal sequence of the predetermined ID.

4. The method of claim 3, wherein the D2D synchronization signal reception power is measured after a frequency offset is compensated.

5. The method of claim 1, wherein the symbol period corresponds to a symbol length which is predetermined on the basis of timing firstly exceeding a predetermined value while the D2D synchronization signal and predetermined sequences are correlated with each other.

6. The method of claim 1, wherein the D2D synchronization signal reception power corresponds to a correlation result value of timing at which a peak occurs while the D2D synchronization signal and predetermined sequences are correlated with each other.

7. The method of claim 1,
wherein the D2D synchronization signal reception power corresponds to average of correlation result values of timing at which N number of peaks occur while the D2D synchronization signal and predetermined sequences are correlated with each other, and
wherein N number is a predetermined positive integer.

8. The method of claim 1, wherein the D2D synchronization signal reception power corresponds to average of peak values exceeding a predetermined value among results of correlation between the D2D synchronization signal and predetermined sequences.

9. The method of claim 1, wherein the D2D synchronization signal is transmitted on 6 resource blocks located at the center of a subframe.

10. A D2D (device to device) UE in a wireless communication system, comprising:
a reception module including a transceiver; and
a processor configured to control the reception module to receive D2D synchronization signals,
wherein the processor is further configured to:
measure at least one of D2D synchronization signal reception power for the received D2D synchronization signals,
calculate D2D synchronization signal reception quality using the measured D2D synchronization signal reception power,
select a D2D synchronization signal among the received D2D synchronization signals based on the D2D synchronization signal reception quality, and
obtain a synchronization from the selected D2D synchronization signal,
wherein the D2D synchronization signal reception quality corresponds to a value resulted from dividing the D2D synchronization signal reception power by a difference between total reception power and the D2D synchronization signal reception power, and
wherein the total reception power is related to a symbol period corresponding to a predetermined symbol length based on a timing at which a peak occurs while the D2D synchronization signal and predetermined sequences are correlated with each other.

* * * * *